(12) United States Patent
Nagashima et al.

(10) Patent No.: US 8,026,691 B2
(45) Date of Patent: Sep. 27, 2011

(54) DOUBLE ENDED INVERTER SYSTEM WITH A CROSS-LINKED ULTRACAPACITOR NETWORK

(75) Inventors: James M. Nagashima, Cerritos, CA (US); Brian A. Welchko, Torrance, CA (US); Sibaprasad Chakrabarti, Torrance, CA (US); Milun Perisic, Torrance, CA (US); Gregory S. Smith, Woodland Hills, CA (US); George John, Cerritos, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 680 days.

(21) Appl. No.: 12/132,482

(22) Filed: Jun. 3, 2008

(65) Prior Publication Data

US 2009/0033254 A1     Feb. 5, 2009

Related U.S. Application Data (60) Provisional application No. 60/952,784, filed on Jul. 30, 2007.

(51) Int. Cl.
*H02P 27/04*     (2006.01)

(52) U.S. Cl. ... 318/801; 318/139; 318/105; 318/400.07; 318/400.26; 318/808; 363/71; 363/98; 180/65.1; 180/65.21

(58) Field of Classification Search .................. 318/801, 318/139, 105, 400.27, 400.26, 808; 363/71, 363/98; 180/65.1, 65.21
See application file for complete search history.

(56) References Cited

U.S. PATENT DOCUMENTS

| | | |
|---|---|---|
| 5,389,749 A | 2/1995 | Hokari et al. |
| 7,130,205 B2 | 10/2006 | Peng |
| 7,154,237 B2 | 12/2006 | Welchko et al. |
| 7,199,535 B2 * | 4/2007 | Welchko et al. .............. 318/105 |
| 2003/0231518 A1 * | 12/2003 | Peng .............................. 363/98 |
| 2005/0254275 A1 | 11/2005 | Nojima et al. |

FOREIGN PATENT DOCUMENTS

CN     2871284 Y     2/2007

OTHER PUBLICATIONS

Singh, G.K., "Multi-Phase Induction Machine Drive Research—A Survey," Elsevier Science B.V., Electric Power Systems Research, 2002, pp. 139-147.

(Continued)

*Primary Examiner* — Bentsu Ro
*Assistant Examiner* — Erick Glass
(74) *Attorney, Agent, or Firm* — Ingrassia Fisher & Lorenz, P.C.

(57) ABSTRACT

A double ended inverter system for an AC traction motor of a vehicle includes a fuel cell configured to provide a DC voltage, an impedance source inverter subsystem coupled to the fuel cell, a DC voltage source, and an inverter subsystem coupled to the DC voltage source. The impedance source inverter subsystem, which includes an ultracapacitor, is configured to drive the AC traction motor. The inverter subsystem is configured to drive the AC electric traction motor. The ultracapacitor is implemented in a crossed LC network coupled to the fuel cell.

13 Claims, 4 Drawing Sheets

OTHER PUBLICATIONS

Peng, Fang Zheng, "Z-Source Inverter," IEEE Transactions on Industry Applications, Mar./Apr. 2003, vol. 39, No. 2, pp. 504-510.

Jones, Martin et al., "A Six-Phase Series-Connected Two-Motor Drive With Decoupled Dynamic Control," IEEE Transactions on Industry Applications, Jul./Aug. 2005, vol. 41, No. 4, pp. 1056-1066.

Welchko, Brian A., "A Double-Ended Inverter System for the Combined Propulsion and Energy Management Functions in Hybrid Vehicles with Energy Storage," The 31st Annual Conference of the IEEE Industrial Electronics Society, IECON '05, Raleigh, North Carolina, Nov. 6-10, 2005, pp. 1-6.

Levi, Emil et al., "A Series-Connected Two-Motor Six-Phase Drive With Induction and Permanent Magnet Machines," IEEE Transactions on Energy Conversion, Mar. 2006, vol. 21, No. 1, pp. 121-129.

Chinese Office Action for Chinese Application No. 200810215409.X mailed Dec. 27, 2010.

\* cited by examiner

DOUBLE ENDED INVERTER SYSTEM WITH A CROSS-LINKED ULTRACAPACITOR NETWORK

CROSS-REFERENCE TO RELATED APPLICATION

This application claims the benefit of U.S. provisional patent application Ser. No. 60/952,784, filed Jul. 30, 2007 (the entire content of which is incorporated by reference herein).

TECHNICAL FIELD

The subject matter described herein relates generally to an electric traction system. More particularly, the subject matter relates to a double ended inverter system, for use in a hybrid or electric vehicle, that includes an impedance source inverter and at least one ultracapacitor that provides additional energy for driving the vehicle.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles.

Many of the electrical components, including the electric motors used in electric and hybrid electric vehicles, receive electrical power from alternating current (AC) power supplies. However, the power sources (e.g., batteries) used in such applications provide only direct current (DC) power. Thus, devices known as power inverters are used to convert the DC power to AC power. In addition, double ended inverter topologies can be used to drive a single AC motor with two DC power sources.

It may be desirable to use a fuel cell as a DC power source in a double ended inverter system. A fuel cell can be realized as a series connection of many low voltage cells. This type of implementation favors a low voltage, high current stack technology. These fuel cell power systems require a boost converter and additional energy storage to operate efficiently with high voltage electric traction components. However, it may be impractical in a vehicle application to use a separate and distinct boost converter and an associated inverter component with a fuel cell because these additional components add to the cost, weight, and manufacturing complexity of the vehicle.

BRIEF SUMMARY

A double ended inverter system for an AC traction motor of a vehicle is provided. The double ended inverter system includes a fuel cell configured to provide a DC voltage, and an impedance source inverter subsystem coupled to the fuel cell. The impedance source inverter subsystem, which includes an ultracapacitor, is configured to drive the AC traction motor. The double ended inverter system also includes a DC voltage source and an inverter subsystem coupled to the DC voltage source. The inverter subsystem is configured to drive the AC electric traction motor.

An embodiment of an electric traction system for a vehicle having an AC traction motor is also provided. The electric traction system includes a fuel cell configured to provide DC voltage for driving the AC traction motor, an ultracapacitor configured to provide DC voltage for driving the AC traction motor, and a double ended inverter system coupled to the AC traction motor. The doubled ended inverter system is configured to drive the AC traction motor using energy obtained from the fuel cell and energy obtained from the ultracapacitor. The double ended inverter system includes a first inverter section coupled to the AC traction motor, a crossed LC X-link coupled between the first inverter section and the fuel cell, the crossed LC X-link comprising a battery, and a second inverter section coupled between the ultracapacitor and the AC traction motor.

Another embodiment of an electric traction system for an AC traction motor of a vehicle is also provided. This embodiment of the system includes a fuel cell configured to provide DC voltage for driving the AC traction motor, a rechargeable battery configured to provide DC voltage for driving the AC traction motor, and a double ended inverter system coupled to the AC traction motor. The double ended inverter system is configured to drive the AC traction motor using energy obtained from the fuel cell and energy obtained from the rechargeable battery. The double ended inverter system includes: a first inverter section coupled to the AC traction motor; a crossed LC X-link coupled between the first inverter section and the fuel cell, the crossed LC X-link comprising an ultracapacitor configured to provide DC voltage for driving the AC traction motor; and a second inverter section coupled between the rechargeable battery and the AC traction motor.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. For the sake of brevity, conventional techniques related to inverters, AC motor control, electric and hybrid electric vehicle operation, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode).

Figure 2:
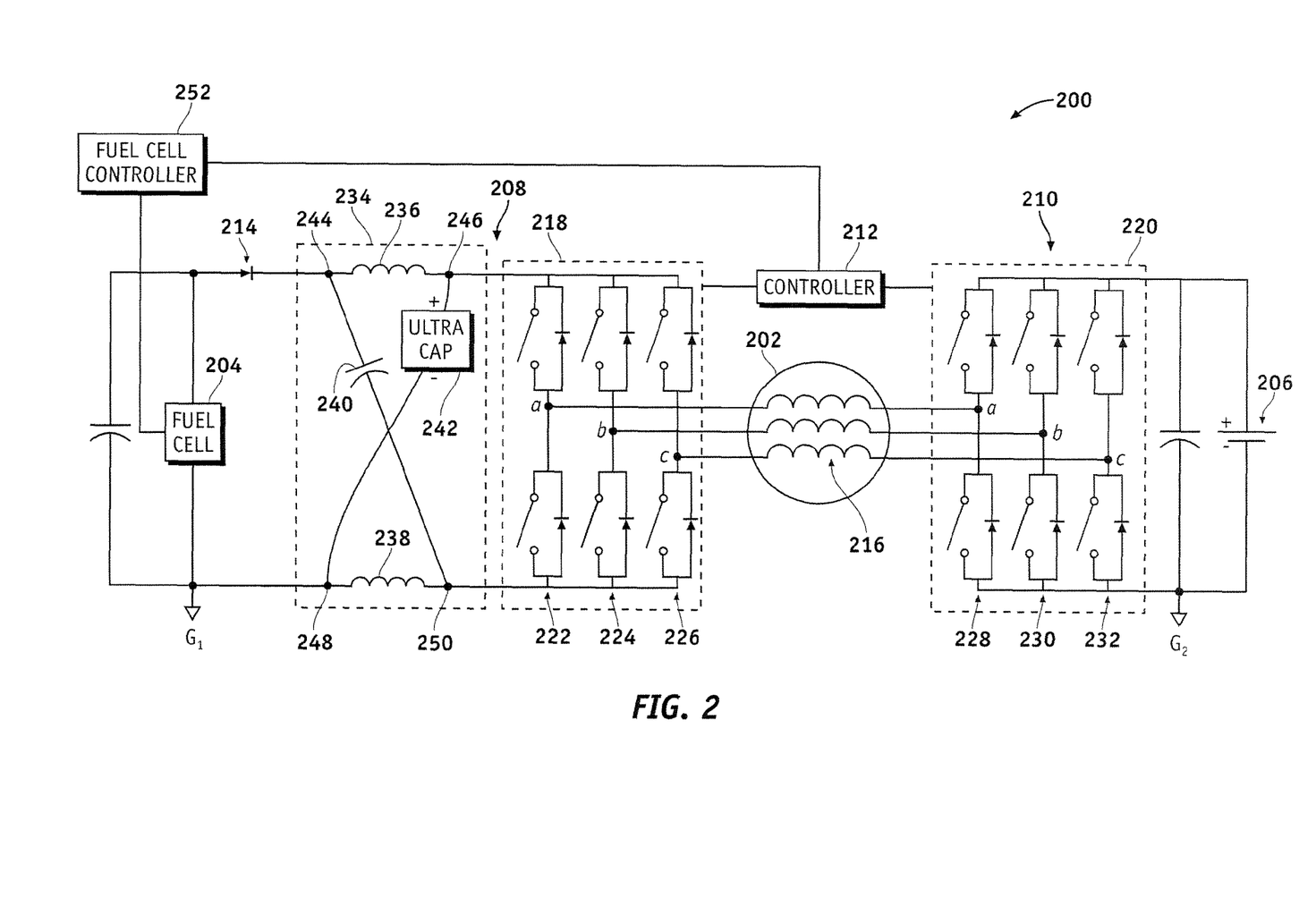
FIG. 2 is a schematic circuit representation of a first embodiment of a double ended inverter system suitable for use with an electric or hybrid electric vehicle.
Figure 3:
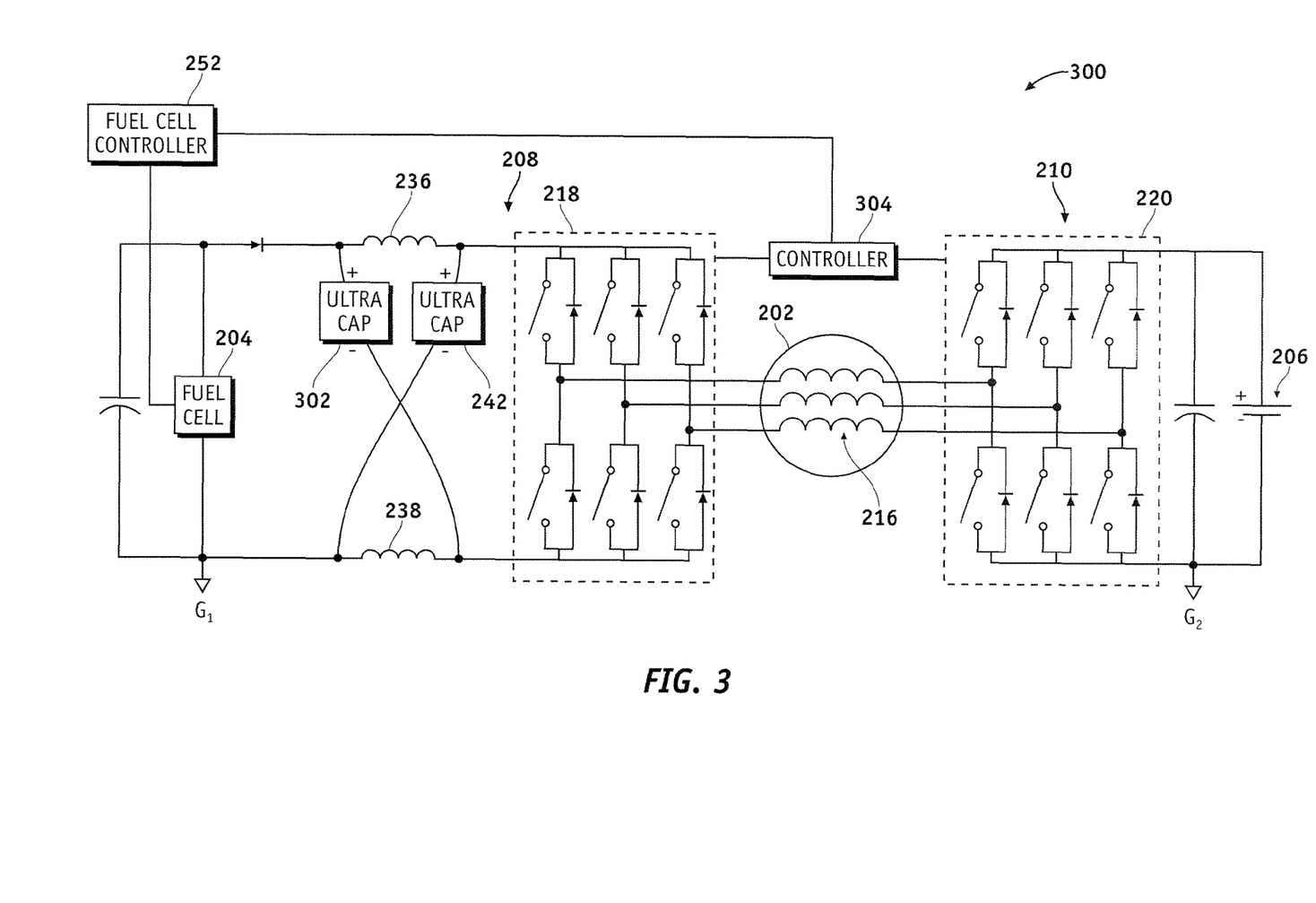
FIG. 3 is a schematic circuit representation of a second embodiment of a double ended inverter system suitable for use with an electric or hybrid electric vehicle.
Figure 4:
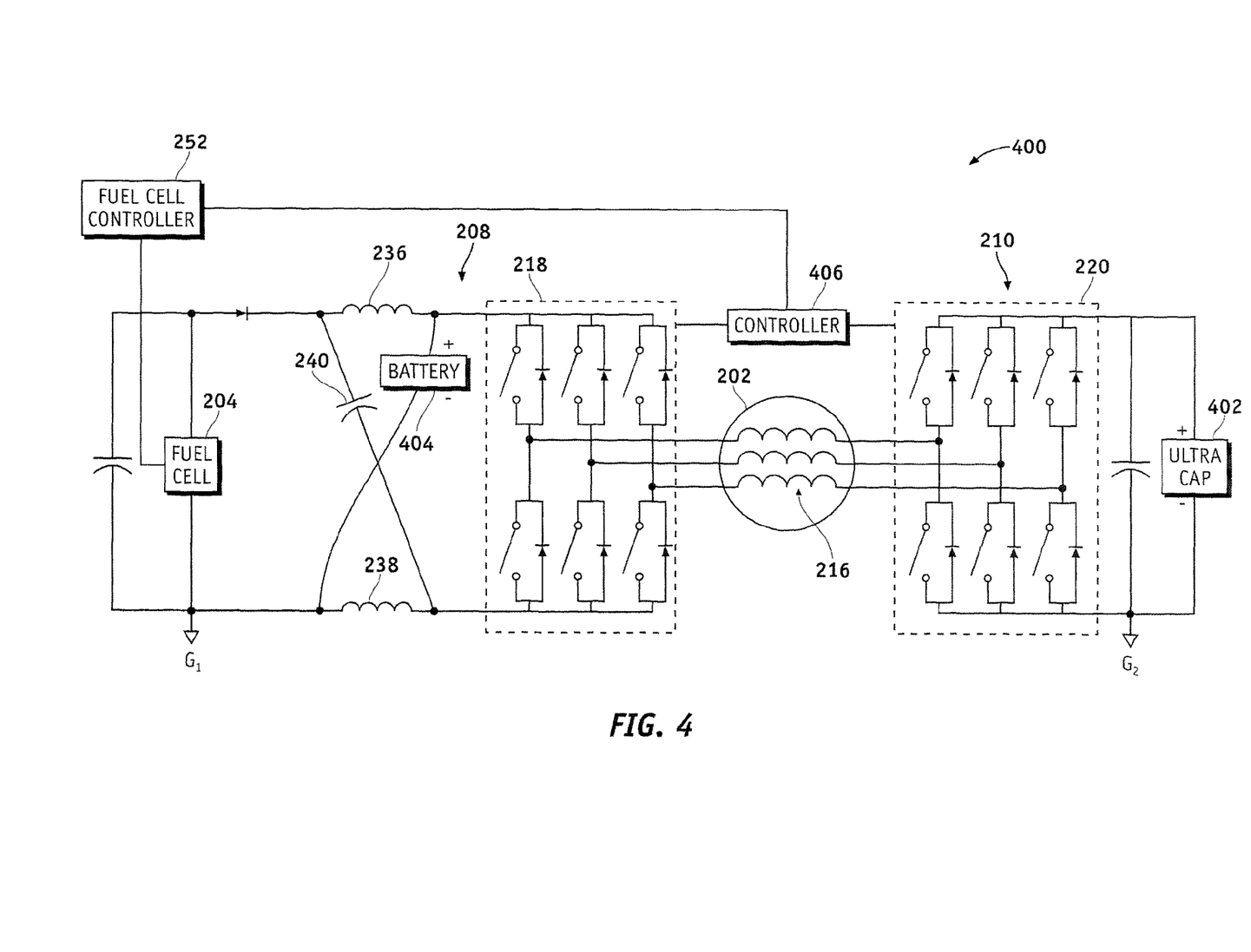
FIG. 4 is a schematic circuit representation of a third embodiment of a double ended inverter system suitable for use with an electric or hybrid electric vehicle.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown in FIGS. 2-4 depict exemplary arrangements of elements, additional intervening elements, devices, features, or components may be present in an embodiment of the depicted subject matter.

A double ended inverter system for an electric traction system of a vehicle is described here. The double ended inverter system utilizes an impedance source inverter topology coupled to a fuel cell, and a traditional inverter topology coupled to another DC energy source, such as a rechargeable battery. In certain embodiments, the impedance source inverter topology includes an ultracapacitor in one (or both) of its cross linked branches. The cross linked network boosts the fuel cell voltage to the appropriate DC link voltage for the ultracapacitor. The double ended inverter provides higher voltage to the motor and bidirectional DC power flow between the battery and ultracapacitor. In an alternate embodiment, the ultracapacitor and the battery are exchanged to form a topology where the impedance source inverter includes the battery in one of its cross link branches. In practice, one or both of the cross link capacitors can be replaced by ultracapacitors.

Figure 1:
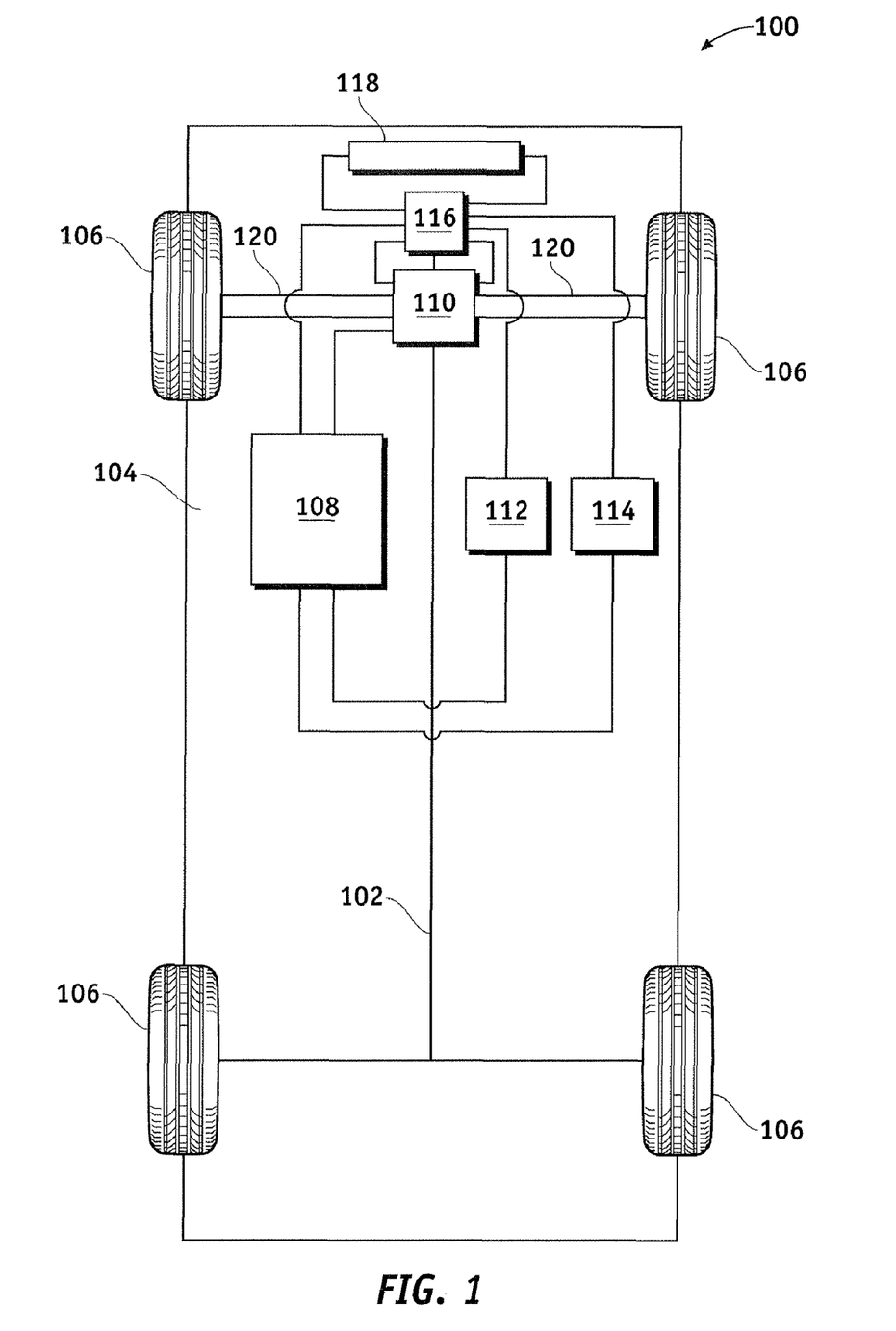
FIG. 1 is a schematic representation of an exemplary vehicle that incorporates an embodiment of a double ended inverter system.

FIG. 1 is a schematic representation of an exemplary vehicle 100 that incorporates an embodiment of a double ended inverter system. Vehicle 100 preferably incorporates an embodiment of a double ended inverter system as described in more detail below. The vehicle 100 generally includes a chassis 102, a body 104, four wheels 106, and an electronic control system 108. The body 104 is arranged on chassis 102 and substantially encloses the other components of vehicle 100. The body 104 and chassis 102 may jointly form a frame. The wheels 106 are each rotationally coupled to chassis 102 near a respective corner of body 104.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 100 may also incorporate any one of, or combination of, a number of different types of engines and/or traction systems, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor.

In the exemplary embodiment illustrated in FIG. 1, vehicle 100 is a fully electric or a hybrid electric vehicle having an electric traction system, and vehicle 100 further includes an electric motor (or traction motor) 110, a fuel cell 112 that provides a DC voltage, a second DC energy source 114 that provides another DC voltage, a double ended inverter system 116, and a radiator 118. As shown, fuel cell 112 and second DC energy source 114 are in operable communication and/or electrically connected to electronic control system 108 and to double ended inverter system 116. It should also be noted that vehicle 100, in the depicted embodiment, does not include a direct current-to-direct current (DC/DC) power converter as an integral part of its electric traction propulsion system.

In one embodiment, fuel cell 112 includes an anode, a cathode, an electrolyte, and a catalyst. As is commonly understood, the anode, or negative electrode, conducts electrons that are freed from, for example, hydrogen molecules so that they can be used in an external circuit. The cathode, or positive electrode, conducts the electrons back from the external circuit to the catalyst, where they can recombine with the hydrogen ions and oxygen to form water. The electrolyte, or proton exchange membrane, conducts only positively charged ions while blocking electrons, while the catalyst facilitates the reaction of oxygen and hydrogen. Depending on the embodiment, various combinations electrolytes, fuels, and oxidants may be used, and it will be appreciated in the art that the subject matter discussed herein applies to any type of fuel cell.

In an exemplary embodiment, fuel cell 112 may be realized as a fuel cell stack or a module formed by combining individual fuel cells in series (e.g., to achieve a higher voltage level) and/or parallel (e.g., to achieve a higher current). In an exemplary embodiment, fuel cell 112 is suitably configured and controlled to provide a variable DC voltage. The particular DC voltage generated by fuel cell 112 can be controlled to accommodate the needs of double ended inverter system 116. In practical embodiments, fuel cell 112 is suitably configured to provide a DC voltage within the range of about 128 to 280 volts.

The second DC energy source 114 utilized by vehicle 100 may be realized as a battery, a battery pack, a fuel cell, an ultracapacitor, a supercapacitor, or the like. For one embodiment described here, second DC energy source 114 is a rechargeable battery (or battery pack) that provides a DC voltage within the range of about 200 to 350 volts. In an alternate embodiment, second energy DC source 114 is an ultracapacitor, which may be implemented as an electrochemical double layer capacitor (EDLC) having a very high energy density relative to common and ordinary capacitors. For example, an ultracapacitor may have an energy density on the order of thousands of times greater than a conventional electrolytic capacitor. When second DC energy source 114 is realized as an ultracapacitor, it provides a DC voltage within the range of about 100 to 400 volts. Such an ultracapacitor may have a capacitance within the range of about 2 to 15 farads.

The motor 110 is preferably a three-phase alternating current (AC) electric traction motor, although other types of motors having a different number of phases could be employed. As shown in FIG. 1, motor 110 may also include or cooperate with a transmission such that motor 110 and the transmission are mechanically coupled to at least some of the wheels 106 through one or more drive shafts 120. The radiator 118 is connected to the frame at an outer portion thereof and although not illustrated in detail, includes multiple cooling channels that contain a cooling fluid (i.e., coolant), such as water and/or ethylene glycol (i.e., antifreeze). The radiator 118 is coupled to double ended inverter system 116 and to motor 110 for purposes of routing the coolant to those components. In one embodiment, double ended inverter system 116 receives and shares coolant with motor 110. In alternative embodiments, the double ended inverter system 116 may be air cooled.

The electronic control system 108 is in operable communication with motor 110, fuel cell 112, second DC energy source 114, and double ended inverter system 116. Although not shown in detail, electronic control system 108 includes various sensors and automotive control modules, or electronic control units (ECUs), such as an inverter control module, a fuel cell controller, and a vehicle controller, and at least one processor and/or a memory which includes instructions stored thereon (or in another computer-readable medium) for carrying out the processes and methods as described below.

FIG. 2 is a schematic circuit representation of an embodiment of a double ended inverter system 200 suitable for use with an electric or hybrid electric vehicle. In certain embodiments, double ended inverter system 116 (shown in FIG. 1) can be implemented in this manner. As depicted in FIG. 2, double ended inverter system 200 is coupled to, and cooperates with, an AC traction motor 202, a fuel cell 204, and a battery 206. Double ended inverter system 200 generally includes, without limitation: an impedance source inverter subsystem 208 coupled to fuel cell 204; an inverter subsystem 210 coupled to battery 206, and a controller 212 coupled to impedance source inverter subsystem 208 and to inverter subsystem 210. To protect fuel cell 204, double ended inverter system 200 may utilize a diode 214 coupled between fuel cell 204 and impedance source inverter subsystem 208. Double ended inverter system 200 allows AC traction motor 202 to be powered by fuel cell 204, battery 206, and a third energy source (described below) that is utilized by impedance source inverter subsystem 208. As explained in more detail below, this topology can also provide voltage matching between fuel cell 204 and battery 206.

The AC traction motor 202, in one embodiment, is a three phase motor that includes a set of three windings (or coils) 216, each corresponding to one phase of AC traction motor 202, as is commonly understood. In one embodiment, the neutral point of AC traction motor 202 is opened up to make it a six terminal, three phase motor. Although not illustrated, AC traction motor 202 includes a stator assembly (including the coils) and a rotor assembly (including a ferromagnetic core), as will be appreciated by one skilled in the art.

Impedance source inverter subsystem 208 includes an inverter section 218, and inverter subsystem 210 includes an inverter section 220. For this embodiment, inverter section 218 and inverter section 220 each includes six switches (e.g., semiconductor devices, such as transistors) with antiparallel diodes (i.e., the direction of current through the transistor switch is opposite to the direction of allowable current through the respective diode). As shown, the switches in inverter section 218 of impedance source inverter subsystem 208 are arranged into three pairs (or legs): pairs 222, 224, and 226. Similarly, the switches in inverter section 220 of inverter subsystem 210 are arranged into three pairs (or legs): pairs 228, 230, and 232. A first winding in the set of windings 216 is electrically coupled, at opposing ends thereof, between the switches of pair 222 (in inverter section 218) and the switches of pair 228 (in inverter section 220). A second winding in the set of windings 216 is coupled between the switches of pair 224 (in inverter section 218) and the switches of pair 230 (in inverter section 220). A third winding in the set of windings 216 is coupled between the switches of pair 226 (in inverter section 218) and the switches of pair 232 (in inverter section 220). Thus, one end of each winding is coupled to impedance source inverter subsystem 208, and the opposite end of each winding is coupled to inverter subsystem 210.

Impedance source inverter subsystem 208 and inverter subsystem 210 are configured to drive AC traction motor 202, individually or collectively (depending upon the particular operating conditions). In this regard, controller 212 is suitably configured to influence the operation of impedance source inverter subsystem 208 and inverter subsystem 210 to manage power transfer among fuel cell 204, battery 206, and AC traction motor 202. For example, the controller 212 is preferably configured to be responsive to commands received from the driver of the vehicle (e.g., via an accelerator pedal) and provides control signals or commands to inverter section 218 of impedance source inverter subsystem 208 and to inverter section 220 of inverter subsystem 210 to control the output of inverter sections 218 and 220. In practice, high frequency pulse width modulation (PWM) techniques may be employed to control inverter sections 218 and 220 and to manage the voltage produced by inverter sections 218 and 220.

In addition to inverter section 218, impedance source inverter subsystem 208 includes a crossed LC X-link 234, which is coupled between inverter section 218 and fuel cell 204. This particular embodiment of crossed LC X-link 234 includes a first inductance element 236, a second inductance element 238, a capacitance element 240, and an ultracapacitor 242. One end of inductance element 236 is coupled to a node 244, and the other end of inductance element 236 is coupled to a node 246. One end of inductance element 238 is coupled to a node 248, and the other end of inductance element 238 is coupled to a node 250. Inverter section 218 may be connected between nodes 246 and 250, as depicted in FIG. 2. In this regard, nodes 246 and 250 may be considered to be input and/or output nodes of inverter section 218. One end of capacitance element 240 is coupled to node 244, and the other end of capacitance element 240 is coupled to node 250. One end of ultracapacitor 242 is coupled to node 246, and the other end of ultracapacitor 242 is coupled to node 248. In other words, capacitance element 240 is coupled between the first end of inductance element 236 and the second end of inductance element 238, while ultracapacitor 242 is coupled between the second end of inductance element 236 and the first end of inductance element 238. The inductance and capacitance of the components in crossed LC X-link 234 are selected based upon factors such as the switching frequency of inverter section 218, the output frequency, the amount of tolerable ripple current, etc. Crossed LC X-link 234 is configured and controlled to facilitate operation of impedance source inverter subsystem 208 in a buck or boost mode, as described in more detail below.

Impedance source inverter subsystem 208 generally operates in the following manner. Crossed LC X-link 234 is ideally modulated at twice (or six times, depending upon the control method) the switching frequency of inverter section 218, because crossed LC X-link 234 is active during the off states of the switching network. During the off states of the switching network (i.e., all upper or lower switches on) the effective voltage of the impedance network can be boosted by turning on both switches in one, two, or three of the phase legs for a controlled duration. This shoot-through condition charges the inductors which add to the available effective DC link voltage during the next active state of inverter section 218. In this regard, impedance source inverter subsystem 208 and crossed LC X-link 234 may function in accordance with known principles and techniques. For example, operation of a known impedance source power converter is described in U.S. Pat. No. 7,130,205, the content of which is incorporated by reference herein.

Ultracapacitor 242 is suitably configured to provide DC voltage for driving AC traction motor 202 under certain conditions. In other words, ultracapacitor 242 represents a third energy source (in addition to fuel cell 204 and battery 206). In preferred vehicle deployments, ultracapacitor 242 can be used to store regenerative braking energy. Thus, to accommodate regenerative energy, double ended inverter system 200 can be controlled such that a certain minimum capacity is maintained in ultracapacitor 242. Accordingly, controller 212 may also be configured to influence operation of impedance source inverter subsystem 208 and inverter subsystem 210 to manage power transfer to and from ultracapacitor 242.

For the illustrated embodiment, node 248 is coupled to the low potential terminal of fuel cell 204 (e.g., a ground or other reference), and node 244 is coupled to the cathode of diode 214. Moreover, the anode of diode 214 is coupled to the high potential terminal of fuel cell 204. For this particular implementation, diode 214 is connected between the positive terminal of fuel cell 204 and node 244. Diode 214 limits current flow into fuel cell 204 during operation of double ended inverter system 200.

Fuel cell 204 may be monitored, managed, and/or controlled by a suitably configured fuel cell controller 252. Fuel cell controller 252 independently controls and regulates the voltage produced by fuel cell 204. In this regard, fuel cell controller 252 may communicate with controller 212 such that controller 212 can consider the amount of energy being generated by fuel cell 204 and, in turn, control double ended inverter system 200 as needed. In other words, fuel cell controller 252 functions as the "leader" in this scenario.

Depending upon the implementation and manner of deployment of double ended inverter system 200, controller 212 can be suitably configured to control impedance source inverter subsystem 208 and/or inverter subsystem 210 in accordance with a number of different operating modes. Such operating modes may include, without limitation, a boost operating mode, a traditional inverter operating mode, a recharge operating mode, or the like. In the boost operating mode, impedance source inverter subsystem 208 boosts the DC voltage produced by fuel cell 204 for compatibility and matching with ultracapacitor 242 and/or battery 206. To sustain the boost operating mode, crossed LC X-link 234 functions to increase the potential across nodes 246 and 250 to a voltage that exceeds that of fuel cell 204. More specifically, the voltage across nodes 246 and 250 is boosted such that it approximates or equals the nominal DC voltage of battery 206. As a result, the AC output voltage of inverter section 218 is higher relative to the AC output voltage that would otherwise be obtained by a traditional inverter topology. This higher voltage afforded by the inclusion of impedance source inverter subsystem 208 can be used to operate double ended inverter system 200 at a more efficient operating point. For this type of operation, fuel cell 204 is providing either active power to AC traction motor 202 or providing zero active power such that inverter section 218 is providing only reactive power to AC traction motor 202, acting to improve the power factor of double ended inverter system 200.

Controller 212 may also sustain operation in the traditional inverter operating mode. In the traditional inverter operating mode, controller 212 maintains the DC voltage provided by fuel cell 204. In other words, the voltage of fuel cell 204 is not boosted. Although the AC output voltage is limited, the desired motor operating point may not require a higher voltage and, hence, the lower available voltage may be sufficient, thus providing a more efficient overall operating point. Controller 212 may also sustain operation in a recharge mode for purposes of recharging battery 206 and/or ultracapacitor 242.

Referring also to FIG. 1, vehicle 100 is operated by providing power to wheels 106 via the AC traction motor 202, which receives its operating energy from fuel cell 204, battery 206, and/or ultracapacitor 242. In order to power the motor, DC power is provided from fuel cell 204 and ultracapacitor 242 to inverter section 218, and/or DC power is provided from battery 206 to inverter section 220. The inverter sections 218 and 220 convert the DC power into AC power, as is commonly understood in the art. In certain embodiments, if the motor does not require the maximum power output of fuel cell 204, the extra power from fuel cell 204 may be used to charge battery 206. Similarly, if the motor does not require the maximum power output of battery 206, the extra power from battery 206 may be used to charge ultracapacitor 242. Of course, under certain operating conditions, controller 212 can be utilized to drive the motor using energy from any combination of the available energy sources.

In operation, controller 212 receives a torque command for AC traction motor 202, and determines how best to manage the flow of power between fuel cell 204 and impedance source inverter subsystem 208, and between battery 206 and inverter subsystem 210. In this manner, controller 212 also regulates the manner in which inverter section 218 and inverter section 220 drive AC traction motor 202. Double ended inverter system 200 may utilize any suitable control methodology, protocol, scheme, or technique. For example, certain aspects of the techniques and technologies described in U.S. Pat. Nos. 7,154,237 and 7,199,535 (both assigned to General Motors Corporation) may be employed by double ended inverter system 200. The relevant content of these patents is incorporated by reference herein.

In practice, the vehicle may include a battery controller, which may be separate from or integrated with controller 212 (typically, it will be separate). The battery controller is suitably configured to monitor the state of charge information (along with other information, such as cell balancing) of battery 206. The battery controller can analyze and/or process such information and provide a power capability to the vehicle controller. The vehicle controller processes the information obtained from the battery controller, along with driver commands, to determine how best to meet the driver's request and satisfy any subsystem requests such as power balancing between the two energy sources.

Although the illustrated embodiment utilizes an impedance source inverter subsystem for the fuel cell side, alternate embodiments may utilize an impedance source inverter subsystem for the battery side in lieu of (or in addition to) an impedance source inverter subsystem for the fuel cell side.

FIG. 3 is a schematic circuit representation of a second embodiment of a double ended inverter system 300 suitable for use with an electric or hybrid electric vehicle. Double ended inverter system 300 is similar in many respects to double ended inverter system 200, and common features, operating characteristics, and elements will not be redundantly described here. Double ended inverter system 300 utilizes another ultracapacitor 302 in lieu of capacitance element 240. Although not a requirement, preferred embodiments can utilize a symmetrical topology where ultracapacitors 242 and 302 are matched. In other words, the capacitance, rating, and other electrical characteristics of ultracapacitors 242 and 302 are the same in preferred embodiments.

A controller 304 is suitably configured to operate double ended inverter system 300 such that both ultracapacitors can provide DC voltage for driving AC traction motor 202, and such that both ultracapacitors can be recharged as needed. Moreover, controller 304 influences operation of inverter section 218 and inverter section 220 to manage power transfer among fuel cell 204, ultracapacitor 302, ultracapacitor 242, battery 206, and AC traction motor 202 as needed during the operation of the host vehicle. In this regard, double ended inverter system 300 can recharge battery 206 using fuel cell 204, ultracapacitor 302, ultracapacitor 242, and/or regenerative energy derived from braking.

FIG. 4 is a schematic circuit representation of a third embodiment of a double ended inverter system 400 suitable for use with an electric or hybrid electric vehicle. Double ended inverter system 400 is similar in many respects to double ended inverter system 200, and common features, operating characteristics, and elements will not be redundantly described here. Double ended inverter system 400 employs an ultracapacitor 402 for the second DC energy source (rather than battery 206 as depicted in FIG. 2 and FIG. 3). Furthermore, double ended inverter system 400 employs a battery 404 in lieu of ultracapacitor 242.

A controller 406 is suitably configured to operate double ended inverter system 400 such that ultracapacitor 402 can provide DC voltage for driving AC traction motor 202, and such that ultracapacitor 402 can be recharged as needed. Moreover, controller 406 influences operation of inverter section 218 and inverter section 220 to manage power transfer among fuel cell 204, ultracapacitor 402, battery 404, and AC traction motor 202 as needed during the operation of the host vehicle. In this regard, double ended inverter system 400 can recharge battery 404 using fuel cell 204, ultracapacitor 402, and/or regenerative energy derived from braking. Although not separately shown in FIG. 4, yet another embodiment utilizes an ultracapacitor for capacitance element 240. In such an embodiment, controller 406 will manage and regulate energy flow among fuel cell 204, (ultra) capacitance element 240, ultracapacitor 402, and AC traction motor 202 using the techniques and methodologies described above.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A double ended inverter system for an AC traction motor of a vehicle, the double ended inverter system comprising:
   a fuel cell configured to provide a DC voltage;
   an impedance source inverter subsystem coupled to the fuel cell and configured to drive the AC traction motor, the impedance source inverter subsystem comprising an ultracapacitor,
   an inverter section, and a crossed LC X-link coupled between the inverter section and the fuel cell, wherein the crossed LC X-link comprises:
   the ultracapacitor;
   a first inductance element having respective first and second ends;
   a second inductance element having respective first and second ends; and
   a capacitance element coupled between the first end of the first inductance element and the second end of the second inductance element;
   a DC voltage source; and
   an inverter subsystem coupled to the DC voltage source and configured to drive the AC electric traction motor; wherein:
   the ultracapacitor is coupled between the second end of the first inductance element and the first end of the second inductance element;
   the second end of the first inductance element is coupled to a first input node of the inverter section;
   the second end of the second inductance element is coupled to a second input node of the inverter section;
   the first end of the second inductance element is coupled to a low potential terminal of the fuel cell; and
   the double ended inverter system further comprises a diode having an anode coupled to a high potential terminal of the fuel cell, and a cathode coupled to the first end of the first inductance element.

2. The double ended inverter system of claim 1, further comprising a controller coupled to the impedance source inverter subsystem and to the inverter subsystem, the controller being configured to influence operation of the impedance source inverter subsystem and the inverter subsystem to manage power transfer among the fuel cell, the DC voltage source, the ultracapacitor, and the AC traction motor.

3. The double ended inverter system of claim 1, wherein the DC voltage source comprises a rechargeable battery.

4. The double ended inverter system of claim 1, wherein the capacitance element comprises a second ultracapacitor.

5. The double ended inverter system of claim 1, wherein the impedance source inverter subsystem is configured to boost the DC voltage provided by the fuel cell.

6. An electric traction system for a vehicle having an AC traction motor, the system comprising:
   a fuel cell configured to provide DC voltage for driving the AC traction motor;
   an ultracapacitor configured to provide DC voltage for driving the AC traction motor; and
   a double ended inverter system coupled to the AC traction motor, and configured to drive the AC traction motor using energy obtained from the fuel cell and energy obtained from the ultracapacitor, the double ended inverter system comprising:
   a first inverter section coupled to the AC traction motor;
   a crossed LC X-link coupled between the first inverter section and the fuel cell, the crossed LC X-link comprising a battery; and
   a second inverter section coupled between the ultracapacitor and the AC traction motor a first inductance element having respective first and second ends; a second inductance element having respective first and second ends; and a capacitance element coupled between the first end of the first inductance element and the second end of the second inductance element; wherein the battery is coupled between the second end of the first inductance element and the first end of the second inductance element; the second end of the first inductance element is coupled to a first input node of the first inverter section; the second end of the second inductance element is coupled to a second input node of the first inverter section; the first end of the second inductance element is coupled to a low potential terminal of the fuel cell; and the double ended inverter system further comprises a diode element coupled between the first end of the first inductance element and a high potential terminal of the fuel cell.

7. The electric traction system of claim 6, further comprising a controller coupled to the first inverter section and to the second inverter section, the controller being configured to influence operation of the first inverter section and the second inverter section to manage power transfer among the fuel cell, the ultracapacitor, the battery, and the AC traction motor.

8. The electric traction system of claim 6, wherein the capacitance element comprises a second ultracapacitor.

9. The electric traction system of claim 6, wherein the battery is rechargeable.

10. An electric traction system for an AC traction motor of a vehicle, the system comprising:
    a fuel cell configured to provide DC voltage for driving the AC traction motor;
    a rechargeable battery configured to provide DC voltage for driving the AC traction motor; and
    a double ended inverter system coupled to the AC traction motor, and configured to drive the AC traction motor using energy obtained from the fuel cell and energy obtained from the rechargeable battery, the double ended inverter system comprising:
    a first inverter section coupled to the AC traction motor;
    a crossed LC X-link coupled between the first inverter section and the fuel cell, the crossed LC X-link comprising an ultracapacitor configured to provide DC voltage for driving the AC traction motor; and
    a second inverter section coupled between the rechargeable battery and the AC traction motor; wherein:
    the crossed LC X-link comprises:
    a first inductance element having respective first and second ends;
    a second inductance element having respective first and second ends; and
    a capacitance element coupled between the first end of the first inductance element and the second end of the second inductance element;
    the ultracapacitor is coupled between the second end of the first inductance element and the first end of the second inductance element;
    the second end of the first inductance element is coupled to a first input node of the first inverter section;
    the second end of the second inductance element is coupled to a second input node of the first inverter section;
    the first end of the second inductance element is coupled to a low potential terminal of the fuel cell; and
    the double ended inverter system further comprises a diode element coupled between the first end of the first inductance element and a high potential terminal of the fuel cell.

11. The electric traction system of claim 10, further comprising a controller coupled to the first inverter section and to the second inverter section, the controller being configured to influence operation of the first inverter section and the second inverter section to manage power transfer among the fuel cell, the rechargeable battery, the ultracapacitor, and the AC traction motor.

12. The electric traction system of claim 10, wherein the capacitance element comprises a second ultracapacitor.

13. The electric traction system of claim 10, wherein the double ended inverter system is configured to boost the DC voltage provided by the fuel cell.

* * * * *